US010681911B2

(12) United States Patent
Catto et al.

(10) Patent No.: US 10,681,911 B2
(45) Date of Patent: Jun. 16, 2020

(54) ANTHELMINTHIC COMPOSITION

(71) Applicant: AgResearch Limited, Hamilton (NZ)

(72) Inventors: Warwick David Catto, Tauranga (NZ); David Malcolm Leathwick, Palmerston North (NZ); Alec Mackay, Palmerston North (NZ)

(73) Assignee: AgResearch Limited, Hamilton (NZ)

( * ) Notice: Subject to any disclaimer, the term of this patent is extended or adjusted under 35 U.S.C. 154(b) by 0 days.

(21) Appl. No.: 16/347,421

(22) PCT Filed: Nov. 2, 2017

(86) PCT No.: PCT/IB2017/056800
§ 371 (c)(1),
(2) Date: May 3, 2019

(87) PCT Pub. No.: WO2018/083611
PCT Pub. Date: May 11, 2018

(65) Prior Publication Data
US 2019/0274309 A1    Sep. 12, 2019

(30) Foreign Application Priority Data

Nov. 3, 2016  (NZ) ........................ 725658

(51) Int. Cl.
*A01N 59/06* (2006.01)
*A01N 59/20* (2006.01)
(52) U.S. Cl.
CPC ............. *A01N 59/06* (2013.01); *A01N 59/20* (2013.01); *Y02P 60/218* (2015.11)

(58) Field of Classification Search
CPC ........ A01N 59/06; A01N 59/20; Y02P 60/218
See application file for complete search history.

(56) References Cited

U.S. PATENT DOCUMENTS

| 2,912,318 | A | 11/1959 | Kieweg |
| 3,428,418 | A | 2/1969 | Mcfarlin et al. |
| 5,143,939 | A | 9/1992 | Browning |
| 5,643,568 | A | 7/1997 | Wolstrup et al. |
| 7,785,388 | B2 | 8/2010 | Hartmann et al. |
| 2003/0206964 | A1 | 11/2003 | Larose |

(Continued)

FOREIGN PATENT DOCUMENTS

| AU | 2011100087 A4 | 2/2011 |
| CN | 105660722 A | 6/2016 |
| WO | WO 2015/132261 A1 | 9/2015 |

OTHER PUBLICATIONS

Su et al, Suppression on plant-parasitic nematodes using a soil fumigation strategy based on ammonium bicarbonate and its effects on the nematode community, 2015, Nature, 5:17597, pp. 1-13. (Year: 2015).*

(Continued)

*Primary Examiner* — Trevor Love
(74) *Attorney, Agent, or Firm* — Leydig, Voit & Mayer, Ltd.

(57) ABSTRACT

The present invention relates generally to combinations comprising an alkaline compound and an ammonium compound that are useful for reducing the number of free living parasitic helminths on various surfaces, to methods of using such combinations, and to the use of such combinations for killing helminths, particularly nematodes.

23 Claims, 6 Drawing Sheets

(56) References Cited

U.S. PATENT DOCUMENTS

2009/0186767 A1   7/2009   Arbogast et al.
2013/0150439 A1   6/2013   Khan

OTHER PUBLICATIONS

Al-Hazmi et al. (Apr. 2014) "Effect of urea and certain NPK fertilizers on the ceral cyst nematode (Heterodera avenae) on wheat," Saudi Journal of Biological Sciences 21(2): 191-196.

Cairns (Month Unavailable 2016) "Potential anthelmintic properties of nitrogenous fertilisers," Honours dissertation, Lincoln University, New Zealand, accession date Feb. 1, 2017, 43 pp.

"CAL-AM Fact Sheet" (2010) Incitec Pivot Limited, Melbourne, pp. 1-3, available online at www . incitecpivotfertilisers. com.au/en/Agronomy/~/media/Files/IPF%20Migration/FertFacts/CalamFactSheet/CalamFSV3IIPLLM15102009.ashx.

Gonzalez-Garduno et al. (2010) "The effect of sodium hypochlorite and a citric extract on the reduction of anthelmintic-resistant gastrointestinal nematodes in hair sheep" with English translation, Revista Mexicana De Ciencias Pecuarias 1(2): 179-187.

Goode et al. (1974) "Effect of liquid nitrogen solutions on ruminant parasite larvae," Annual meeting of the Southern Section Animal Society of Animal Science. Journal of Animal Science 38 pp. 224 (abstract only).

Gowen "Chemical control of nematodes: efficiency and side-effects," FAO Corporate Document Repository, accession date Oct. 23, 2015, 5 pp.

Greer et al. (Aug. 2015) "The effect of acid fertilisers on parasite larval development and viability," Concurrent Session 6.3, Novel approaches to chemical and non-chemical control (endo and ectoparasites), 1 pp (abstract only).

Howell et al. (1999) "Control of gastrointestinal parasite larvae of ruminant using nitrogen fertiliser, limestone and sodium hypochlorite solutions," Small Ruminant Research 32: 197-204.

Hunt et al. (1997) "Immunoreactive amino-terminal pro-brain natriuretic peptide (NT-PROBNP): a new marker of cardiac impairment," Clinical Endocrinology 47(3): 287-296 (abstract only).

International Preliminary Report on Patentability, dated May 16, 2019, corresponding to International Application No. PCT/IB2017/056800 (filed Nov. 2, 2017), 8 pp.

Mackay et al. (Aug. 2014) "Reducing infective parasite larvae on pasture," Report RE500/2014/090 for Ballance Agri nutrients 18 pp.

Mackay et al. (Jan. 2015) "Phase 2: reducing infective parasite larvae on pasture," RE RE500/2015/006 for Ballance-Agri nutrients 20 pp.

Parnell (1936) "Notes on the survival of the eggs and free living larvae of sclerostomes on pasture," Scientific Agriculture 16: 391-397.

Search Report and Written Opinion, dated Feb. 12, 2018, corresponding to International Application No. PCT/IB2017/056800 (filed Nov. 2, 2017), 11 pp.

Strande et al. (2014) Faecal Sludge Management: Systems Approach for Implementation and Operation, IWA Publishing, Alliance House, London, 2014, pp. 1-122; url: www. un-ihe.org /sites/default/files/fsm_book_1r.pdf.

Su et al. (2015) "Suppression on plant-parasitic nematodes using a soil fumigation strategy based on ammonium bicarbonate and its effects on the nematode community," Scientific Reports 5: 17597, 13 pp.

Thilakan et al. (2007) "Ovicidal property of certain fertilisers in the control of infective larvae of common nematode parasites of domestic ruminants," Journal of Veterinary Parasitology 21: 55-57.

"Tricking bugs into killing themselves," agResearch, (Oct. 2015), p. 22.

* cited by examiner

ANTHELMINTHIC COMPOSITION

CROSS-REFERENCE TO RELATED APPLICATIONS

This application is a U.S. National Stage Application filed under 35 U.S.C. § 371 of International Application No. PCT/IB2017/056800, filed Nov. 2, 2017, which claims the benefit of New Zealand Application No. 725658, filed Nov. 3, 2016. Both of these applications are hereby incorporated by reference in their entireties.

TECHNICAL FIELD

The present invention relates generally to combinations comprising an alkaline compound and an ammonium compound that are useful for reducing the number of free living parasitic helminths on various surfaces, to methods of using such combinations, and to the use of such combinations for killing helminths, particularly nematodes. In some embodiments, the combinations is useful for reducing the number of free living parasitic helminths on forages, grasses and pastures.

BACKGROUND OF THE INVENTION

Livestock herds are subject to infection with internal parasites, including the parasitic helminths; roundworms, tapeworms and flukes (i.e., Nematoda, Cestoda and Trematoda) which have either free living stages or intermediate hosts. Recurring infection with these parasites is a constant challenge for livestock management, particularly animals under 12 months of age. Standard treatments comprise the use of synthetic compounds often called "dewormers" to treat infections internally in affected animals. However, the use of such dewormers offers only a short term solution. Many parasitic helminths are cosmopolitan in distribution and present naturally in pasture and field environments. Therefore, grazing livestock are continually subject to reinfection from parasites present in fields and pastures, (e.g., animals under 12 months of age, ewes in late lactation or other periods of stress) requiring treatment after each new infection event.

A major drawback related to the routine use of synthetic dewormer compounds, is that the overuse can select for parasite strains that are resistant to these compounds (e.g., levamisole, benzimidazole and ivermectin). There are also indications in the literature that deworming compounds may slow the development of immunity to these parasites in young animals and slow the decomposition of manure by impacting negatively on soil biota.

Accordingly there is a need in the art for new ways of controlling the populations of free living parasitic helminths, particularly free living parasitic nematodes, such that the infection and re-infection rates of grazing animals are reduced. There is also a need in the art for new methods of controlling the populations of free living parasitic helminths, particular free living parasitic nematodes, and particularly on pastures or fields, such that infection and reinfection rates of all susceptible animals is reduced.

It is an object of the invention to provide an anthelmintic comprising a combination of an alkaline compound and an ammonium compound that is effective at controlling free living parasitic helminths, particularly free living parasitic nematodes, and/or to go at least some way towards avoiding the above disadvantages in the art and/or that at least provides the public with a useful choice.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY OF THE INVENTION

In one aspect, the present invention relates to a combination comprising an alkaline compound and an ammonium compound.

In another aspect the invention relates to a combination consisting essentially of an alkaline compound and an ammonium compound.

In another aspect the invention relates to a combination consisting of an alkaline compound, an ammonium compound and a carrier, diluent or excipient.

In one embodiment the combination is an anthelmintic. In one embodiment the combination is effective at controlling free living parasitic helminths, preferably free living parasitic nematodes, upon contact.

In one embodiment, contact between the combination and the free living parasitic helminths occurs at a locus, preferably a treatment locus.

In one embodiment the combination is a composition.

In another aspect the invention relates to a composition comprising an alkaline compound and an ammonium compound.

In another aspect the invention relates to a composition consisting essentially of an alkaline compound and an ammonium compound.

In another aspect the invention relates to a composition consisting of an alkaline compound, an ammonium compound and a carrier, diluent or excipient.

In one embodiment the composition is an anthelmintic. In one embodiment the composition is effective at controlling free living parasitic helminths, preferably free living parasitic nematodes, upon contact.

In one embodiment, contact between the composition and the free living parasitic helminths occurs at a locus, preferably a treatment locus.

In another aspect the invention relates to a method of controlling free living parasitic helminths at a treatment locus comprising contacting a treatment locus, or at least one free living parasitic helminth at a treatment locus, with a combination or composition of the invention. Preferably contacting is for a sufficient time to allow the combination or composition of the invention to control the free living parasitic helminths at the treatment locus.

In another aspect the invention relates to a method of controlling free living stages of the parasitic helminths in a treatment environment comprising applying a combination or composition of the invention to the treatment environment.

In another aspect the invention relates to the use of an alkaline compound and an ammonium compound to control free living parasitic helminths, preferably free living parasitic nematodes.

In another aspect the invention relates to the use of a combination or a composition of the invention to control free living parasitic helminths, preferably free living parasitic nematodes.

In another aspect the invention relates to a method of making a combination or composition of the invention comprising formulating the combination or composition as an anthelmintic comprising or consisting essentially of an alkaline compound and an ammonium compound, wherein the combination or composition is effective at controlling free living parasitic helminths, preferably free living parasitic nematodes, at a treatment locus.

In another aspect the invention relates to a method of making a combination or composition of the invention comprising formulating the combination or composition as an anthelmintic consisting of an alkaline compound, an ammonium compound, and a carrier, diluent or excipient, wherein the combination or composition is effective at controlling free living parasitic helminths, preferably free living parasitic nematodes, at a treatment locus.

Various embodiments of the different aspects of the invention as discussed above are also set out below in the detailed description of the invention, but the invention is not limited thereto.

Other aspects of the invention may become apparent from the following description which is given by way of example only and with reference to the accompanying drawings.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

The invention will now be described by way of example only and with reference to the drawings in which.

DETAILED DESCRIPTION OF THE INVENTION

Definitions

Unless otherwise specified, all technical and scientific terms used herein are to be understood as having the same meanings as is understood by one of ordinary skill in the relevant art to which this disclosure pertains. Examples of definitions of common terms in medicine, molecular biology and biochemistry can be found in: Dictionary of Microbiology and Molecular Biology, Singleton et al., $2^{nd}$ edition, (1994); The Encyclopedia of Molecular Biology, Kendrew et al. (Eds.), Blackwell Science Ltd., (1994); Molecular Biology and Biotechnology: a Comprehensive Desk Reference, Robert A. Meyers (Ed.), VCH Publishers, Inc., (1995); The Dictionary of Cell & Molecular Biology, 4th Edition, Lackie. J (Ed.), Academic Press Inc (2007); and The Oxford Dictionary of Biochemistry and Molecular Biology, $2^{nd}$ edition, Cammack et al. (Eds.), Oxford University Press Inc. (2006); Nematode parasites of vertebrates: their development and transmission. Anderson, R. C. (2000) University of Guelph, Guelph, Ontario, Canada; Greenwood, Norman N.; Earnshaw, Alan (1997). Chemistry of the Elements ($2^{nd}$ Ed.). Butterworth-Heinemann.

It is also believed that practice of the present invention can be performed using standard chemical and biochemical protocols and procedures as known in the art, and as described, for example in the above reference materials, and other commonly available reference materials relevant in the art to which this disclosure pertains, and which are all incorporated by references herein in their entireties.

The following definitions are presented to better define the present invention and as a guide for those of ordinary skill in the art in the practice of the present invention.

The term "helminth" as used herein means worm, taking its generally accepted meaning as known in the art. The term "parasitic helminth" as used herein is also used as recognized in the art and means the three groups of medically relevant helminths, Flukes (Trematodes), Tapeworms (Cestodes) and Roundworms (Nematodes) (Medical Microbiology. $4^{th}$ Ed. Baron, S ed., University of Texas Medical Branch at Galveston; 1996; Chap. 86). In some embodiments the free living stage of a parasitic helminth is a free living parasitic nematode. Preferably the free living parasitic nematode is a known parasite of bovine, cervine, ovine, porcine, caprine, equine, and camelids.

The term "free living stage of a parasitic helminth" as used herein means any stage of a parasitic helminth outside of the animal. For example, a free living stage of a parasitic helminth can be an egg or larval (L1, L2, L3) stages of a parasitic helminth, including all larval stages.

The terms "control" and "controlling" (and similar grammatical constructions) as used herein with regard to free living parasitic helminths mean that the combination or composition of the invention is effective in reducing the population of the free living parasitic helminth in an environment treated with the combination or composition as compared to an environment that is not treated, including both the treated environment pre-treatment, and an untreated control environment.

More specifically, "control" and "controlling", as used herein, mean that the combination or composition is effective in killing the respective free living parasitic helminth(s), inhibiting its growth, or inhibiting its proliferation. Generally, when used for the treatment of an environment, the combination or composition of the invention is applied directly or indirectly to various surfaces present in the environment, but not limited thereto.

By way of non-limiting example, where the environment is a pasture or field, the combination or composition of the invention may be applied directly or indirectly to the surfaces of any plants, other biological materials including feces or organisms, soil, and rocks (but not limited thereto) present in the pasture or field. In a different non-limiting example, an environment may be an enclosed or partially enclosed structure or building such as a house, barn, feed barn, milking barn or shed, toolshed, outhouse, or farm outbuilding, or covered area where the combination or composition of the invention is applied to all surfaces of and/or within the structure, and/or to any substructure or equipment therein.

"Pasture(s)" as used herein refers to all of the component parts typically found in a pasture as known in the art such as soil surface, litter and dung, but not limited thereto.

"Contact" and "contacting" as used herein mean that the combination or composition of the invention is brought into contact with a free living parasitic helminth in a treatment environment or at a treatment locus. "Brought into contact" means that the combination or composition is either contacted to the free living parasitic helminth, or is placed in a treatment environment or at a treatment locus such that a free living parasitic helminth will come into contact with the combination as a matter of course. Preferably the free living parasitic helminth will come into contact with the combination of the invention by contacting a surface to which the combination of the invention has been applied.

The term "anthelmintic" as used herein takes its commonly accepted meaning in the art and refers to a combination or composition that controls parasitic helminths, including free living parasitic helminths, particularly free living parasitic nematodes.

The term "ammonium compound" as used herein refers to a compound in the composition or combination that provides an ammonium ion upon dissociation. In some embodiments an ammonium compound is an ammonium salt or complex ammonium salt.

The term "alkaline compound" in the context of the invention refers to a compound that acts to increase the pH of the combination or composition and that provides a counter-ion.

A "counter ion" is at least one of calcium, magnesium, zinc, copper, cobalt, lithium, sodium or potassium, but not necessarily limited thereto.

A "treatment environment" as used herein is an environment that has been treated with a combination or composition of the invention.

A "treatment locus" as used herein is a locus that has been treated with a combination or composition of the invention.

The terms "control environment", "control locus" and a "control treatment" take their ordinary meaning in the art and are used herein to indicate environments, loci and/or treatments from which baseline data is gathered for comparison to data obtained from a corresponding treatment environment or locus, allowing identification of any variation seen between the baseline and the treatment environment and/or locus.

A level "higher" or "lower" than a control, or a change or deviation from a control in one embodiment is statistically significant. A higher level, lower level, deviation from, or change from a control level or mean control level can be considered to exist if the level differs from the control level by 5% or more, by 10% or more, by 20% or more, or by 50% or more compared to the control level. Statistically significant may alternatively be calculated as P≤0.10, 0.05. In a further alternative, higher levels, lower levels, deviation, and changes can be determined by recourse to assay reference limits or reference intervals. These can be calculated from intuitive assessment or non-parametric methods. Overall, these methods calculate the 0.025, and 0.975 fractiles as 0.025*(n+1) and 0.975 (n+1). Such methods are well known in the art (Hunt et al., 1997 Clin. Endocrinol. 47:287-296; The Immunoassay Handbook. $3^{rd}$ edition, ed. David Wild. Elsevier Ltd, 2005). The terms "reduces", "reduced" and "reducing" and other grammatical variations as used herein mean the same thing as "lower".

A "statistically significant amount" as used herein describes a mathematical measure of difference between groups. The difference is said to be statistically significant if it is greater than what might be expected to happen by chance alone.

The term "weight for weight (w/w)" means the amount of the solute as a percent (by mass) of the total solution.

As used herein, where a value or integer is indicated as a "%" only with no units appended, the "%" refers to a mass concentration (mass/volume).

The term "comprising" as used in this specification means "consisting at least in part of". When interpreting statements in this specification that include that term, the features, prefaced by that term in each statement, all need to be present but other features can also be present. Related terms such as "comprise" and "comprised" are to be interpreted in the same manner.

The term "consisting essentially of" as used herein means the specified materials or steps and those that do not materially affect the basic and novel characteristic(s) of the claimed invention.

The term "consisting of" as used herein means the specified materials or steps of the claimed invention, excluding any element, step, or ingredient not specified in the claim.

DESCRIPTION

The inventors believe that they are the first to show that a combination or composition of the invention, comprising or consisting essentially of an alkaline compound and an ammonium compound, is effective at controlling free living parasitic helminths, particularly free living parasitic nematodes. Specifically, the inventors believe they are the first to identify that a combination or composition of the invention is effective at controlling free living parasitic helminths, particularly free living parasitic nematodes when the combination or composition is applied directly the helminths, or when it is applied directly to a treatment locus where the free living parasitic helminths will come into contact with the combination or composition.

In particular, the inventors have identified that a combination of calcium hydroxide ($Ca(OH)_2$) and ammonium nitrate ($NH_4NO_3$) can be used to control free living parasitic helminths in fields and/or pastures by applying the combination of the invention to fields and/or pastures. In one embodiment the ($Ca(OH)_2$) is provided initially in the form of calcium oxide (CaO) on the basis that CaO converts at a ratio of 1:1 in water from CaO to ($Ca(OH)_2$) in dilute solutions. In some embodiments the ammonium nitrate may be substituted with a different ammonium salt.

To the best of the inventor's knowledge, they are the first to provide $Ca(OH)_2$ and $NH_4NO_3$ in a combination that is effective at controlling free living parasitic helminths, particularly free living parasitic nematodes.

It will be appreciated that the use of calcium compounds is known in some agricultural contexts, particularly the use of lime as a soil amendment for adjusting pH. In contrast, the use of an alkaline compound, particularly calcium oxide or calcium hydroxide, according to the invention is not for the purposes of soil amendment. Moreover, the quantities of a liming agent (i.e., CaO) used when amending soils to achieve a desired soil pH are several orders of magnitude greater than the quantities of the alkaline compound, particularly calcium oxide or hydroxide, employed in the present invention.

Combinations for Controlling Free Living Parasitic Helminths

Accordingly, in one aspect the present invention relates to a combination comprising an alkaline compound and an ammonium compound.

In another aspect the invention relates to a combination consisting essentially of an alkaline compound and an ammonium compound.

In another aspect the invention relates to a combination consisting of an alkaline compound, an ammonium compound and a carrier, diluent or excipient.

In one embodiment the combination is a pesticidal combination, preferably an anthelmintic. In one embodiment the anthelmintic is effective at controlling free living parasitic helminths, preferably free living parasitic nematodes, upon contact.

In one embodiment, contact between the anthelmintic and the free living parasitic helminths occurs at a locus, preferably a treatment locus.

In one embodiment the alkaline compound comprises an alkaline earth metal. Preferably the alkaline earth metal is selected from the group consisting of beryllium, magnesium, calcium, strontium, and barium, preferably calcium or magnesium, preferably calcium. In one embodiment the alkaline earth metal is a hydroxide or oxide. Preferably the hydroxide or oxide is calcium hydroxide or calcium oxide.

In one embodiment the alkaline compound comprises a transitional metal, preferably zinc or copper.

In one embodiment the alkaline compound is selected from the group consisting of calcium hydroxide, calcium oxide, magnesium hydroxide, zinc hydroxide, copper hydroxide, cobalt hydroxide and magnesium oxide.

In one embodiment the alkaline compound comprises an alkali metal. Preferably the alkali metal comprises caesium, lithium, sodium or potassium. Preferably the alkaline compound is lithium hydroxide (LiOH), sodium hydroxide (NaOH) or potassium hydroxide (KOH).

In one embodiment the ammonium compound is selected from the group consisting of ammonium phosphate, sulfate, nitrate, hydrogen phosphate, carbonate, chloride, acetate, hydroxide, chlorite, phosphite, oxide, oxalate, chromate, sulfide, phosphide, hypochlorite, nitride, dichromate, sulfite, chlorate, nitrite, iodate, perchlorate, fluoride, bromide, thiosulfate, and perbromate.

In one embodiment the ammonium compound is ammonium nitrate.

In one embodiment the combination comprises at least one alkaline earth metal and/or at least one alkali metal, and at least one ammonium compound. Preferably the alkaline earth metal is an oxide or a hydroxide, preferably the oxide or the hydroxide is calcium oxide or calcium hydroxide. Preferably the ammonium compound is an ammonium salt or complex ammonium salt.

In one embodiment the combination comprises or consists essentially of $Ca(OH)_2$ and an ammonium salt or complex ammonium salt, preferably $NH_4NO_3$. In one embodiment the combination consists of $Ca(OH)_2$, an ammonium salt, preferably $NH_4NO_3$ and a carrier, diluent or excipient. In one embodiment the carrier, diluent or excipient is an agriculturally acceptable carrier, diluent or excipient. In one embodiment the carrier, diluent or excipient is water, and the combination comprises or consists essentially of CaO and an ammonium salt, preferably $NH_4NO_3$. In one embodiment the carrier, diluent or excipient is water, and the combination consists of CaO and an ammonium salt, preferably $NH_4NO_3$ and water.

In one embodiment the combination comprises or consists essentially of at least about 10%, or at least about 11%, or at least about 12%, or at least about 13%, or at least about 14%, or at least about 15%, or at least about 16%, or at least about 17%, or at least about 18%, or at least about 19%, or at least about 20%, preferably at least about 14% ammonium salt or complex ammonium salt, preferably $NH_4NO_3$.

In one embodiment the combination comprises or consists essentially of at least 10%, or at least 11%, or at least 12%, or at least 13%, or at least 14%, or at least 15%, or at least 16%, or at least 17%, or at least 18%, or at least 19%, or at least 20%, preferably at least 14% ammonium salt or complex ammonium salt, preferably $NH_4NO_3$.

In one embodiment the combination comprises or consists essentially of about 0.01% to about 1%, or about 0.02% to about 0.9%, or about 0.03% to about 0.8%, or about 0.04% to about 0.7%, or about 0.05% to about 0.6%, or preferably about 0.5% $Ca(OH)_2$, preferably about 0.1% $Ca(OH)_2$.

In one embodiment the combination comprises or consists essentially of about 0.01% to about 1%, or about 0.02% to about 0.9%, or about 0.03% to about 0.8%, or about 0.04% to about 0.7%, or about 0.05% to about 0.6%, preferably about 0.5% CaO, preferably about 0.1% CaO.

In one embodiment the combination comprises or consists essentially of at least about 10%, or at least about 11%, or at least about 12%, or at least about 13%, or at least about 14%, or at least about 15%, or at least about 16%, or at least about 17%, or at least about 18%, or at least about 19%, or at least about 20%, preferably at least about 14% ammonium salt or complex ammonium salt, preferably $NH_4NO_3$, and about 0.01% to about 1%, or about 0.02% to about 0.9%, or about 0.03% to about 0.8%, or about 0.04% to about 0.7%, or about 0.05% to about 0.6%, preferably about 0.5% $Ca(OH)_2$, preferably about 0.1% $Ca(OH)_2$.

In one embodiment the combination comprises or consists essentially of at least about 10%, or at least about 11%, or at least about 12%, or at least about 13%, or at least about 14%, or at least about 15%, or at least about 16%, or at least about 17%, or at least about 18%, or at least about 19%, or at least about 20%, preferably at least about 14% ammonium salt or complex ammonium salt, preferably $NH_4NO_3$, and about 0.01% to about 1%, or about 0.02% to about 0.9%, or about 0.03% to about 0.8%, or about 0.04% to about 0.7%, or about 0.05% to about 0.6%, preferably about 0.5% CaO, preferably about 0.1% $Ca(OH)_2$.

In one embodiment the combination comprises or consists essentially of at least about 14% ammonium salt or complex ammonium salt, preferably $NH_4NO_3$ and about 0.1% $Ca(OH)_2$.

In one embodiment the combination comprises or consists essentially of at least about 14% ammonium salt or complex ammonium salt, preferably NH$_4$NO$_3$ and about 0.1% CaO.

In one embodiment the combination comprises or consists essentially of at least 14% ammonium salt or complex ammonium salt, preferably NH$_4$NO$_3$ and about 0.1% Ca(OH)$_2$.

In one embodiment the combination comprises or consists essentially of at least 14% ammonium salt or complex ammonium salt, preferably NH$_4$NO$_3$ and about 0.1% CaO.

In one embodiment the combination comprises or consists essentially of at least 10%, or at least 11%, or at least 12%, or at least 13%, or at least 14%, or at least 15%, or at least 16%, or at least 17%, or at least 18%, or at least 19%, or at least 20%, preferably at least 14% ammonium salt or complex ammonium salt, preferably NH$_4$NO$_3$, and about 0.01% to about 1%, or about 0.02% to about 0.9%, or about 0.03% to about 0.8%, or about 0.04% to about 0.7%, or about 0.05% to about 0.6%, preferably about 0.5% Ca(OH)$_2$, preferably about 0.1% Ca(OH)$_2$.

In one embodiment the combination comprises or consists essentially of at least 10%, or at least 11%, or at least 12%, or at least 13%, or at least 14%, or at least 15%, or at least 16%, or at least 17%, or at least 18%, or at least 19%, or at least 20%, preferably at least 14% ammonium salt or complex ammonium salt, preferably NH$_4$NO$_3$, and about 0.01% to about 1%, or about 0.02% to about 0.9%, or about 0.03% to about 0.8%, or about 0.04% to about 0.7%, or about 0.05% to about 0.6%, preferably about 0.5% CaO, preferably about 0.1% CaO In one embodiment the combination consists of at least 10%, or at least 11%, or at least 12%, or at least 13%, or at least 14%, or at least 15%, or at least 16%, or at least 17%, or at least 18%, or at least 19%, or at least 20%, preferably at least 14% ammonium salt or complex ammonium salt, preferably NH$_4$NO$_3$, and about 0.01% to about 1%, or about 0.02% to about 0.9%, or about 0.03% to about 0.8%, or about 0.04% to about 0.7%, or about 0.05% to about 0.6%, preferably about 0.5% Ca(OH)$_2$, preferably about 0.1% Ca(OH)$_2$ and a carrier, diluent or excipient. In one embodiment the carrier, excipient or diluent is an agriculturally acceptable carrier, excipient or diluent.

In one embodiment the carrier, excipient or diluent is, or comprises a surfactant. In one embodiment the carrier, excipient or diluent is, or comprises water.

In one embodiment the combination is in the form of a powder or tablet. In one embodiment the powder is comprised in a tablet, granule, capsule or prill. Preferably the tablet, granule, capsule or prill is in a form that will be reconstituted by the addition of a carrier, diluent or excipient. Preferably the carrier, diluent or excipient is an agriculturally acceptable carrier, diluent or excipient, preferably water.

In one embodiment the combination consists of at least 10%, or at least 11%, or at least 12%, or at least 13%, or at least 14%, or at least 15%, or at least 16%, or at least 17%, or at least 18%, or at least 19%, or at least 20%, preferably at least 14% ammonium salt or complex ammonium salt, preferably NH$_4$NO$_3$, and about 0.01% to about 1%, or about 0.02% to about 0.9%, or about 0.03% to about 0.8%, or about 0.04% to about 0.7%, or about 0.05% to about 0.6%, preferably about 0.5% CaO, preferably about 0.1% CaO and water.

In one embodiment the combination comprises 10%, or 11%, or 12%, or 13%, or 14%, or 15%, or 16%, or 17%, or 18%, or 19%, or 20%, preferably 14% ammonium salt or complex ammonium salt, preferably NH$_4$NO$_3$.

In one embodiment the combination comprises 0.01% to 1%, or 0.02% to 0.9%, or 0.03% to 0.8%, or 0.04% to 0.7%, or 0.05% to 0.6%, preferably 0.5%, preferably 0.1% Ca(OH)$_2$.

In one embodiment the combination comprises 0.1% to 1%, or 0.02% to 0.9%, or 0.03% to 0.8%, or 0.04% to 0.7%, or 0.05% to 0.6%, preferably 0.5%, preferably 0.1% CaO.

In one embodiment the combination comprises or consists essentially of 10%, or 11%, or 12%, or 13%, or 14%, or 15%, or 16%, or 17%, or 18%, or 19%, or 20%, preferably 14% ammonium salt or complex ammonium salt, preferably NH$_4$NO$_3$, and 0.1% to 1%, or 0.02% to 0.9%, or 0.03% to 0.8%, or 0.04% to 0.7%, or 0.05% to 0.6%, preferably 0.5%, preferably 0.1% Ca(OH)$_2$.

In one embodiment the combination comprises or consists essentially of 10%, or 11%, or 12%, or 13%, or 14%, or 15%, or 16%, or 17%, or 18%, or 19%, or 20%, preferably 14% ammonium salt or complex ammonium salt, preferably NH$_4$NO$_3$, and 0.1% to 1%, or 0.02% to 0.9%, or 0.03% to 0.8%, or 0.04% to 0.7%, or 0.05% to 0.6%, preferably 0.5%, preferably 0.1% CaO.

In one embodiment the combination comprises or consists essentially of 14% ammonium salt or complex ammonium salt, preferably NH$_4$NO$_3$ and 0.5% Ca(OH)$_2$.

In one embodiment the combination comprises or consists essentially of 14% ammonium salt or complex ammonium salt, preferably NH$_4$NO$_3$ and 0.5% CaO.

In one embodiment the combination comprises or consists essentially of 14% ammonium salt or complex ammonium salt, preferably NH$_4$NO$_3$ and 0.1% Ca(OH)$_2$.

In one embodiment the combination comprises or consists essentially of 14% ammonium salt or complex ammonium salt, preferably NH$_4$NO$_3$ and 0.1% CaO.

In one embodiment the combination consists of 10%, or 11%, or 12%, or 13%, or 14%, or 15%, or 16%, or 17%, or 18%, or 19%, or 20%, preferably 14% ammonium salt or complex ammonium salt, preferably NH$_4$NO$_3$, and 0.01% to 1%, or 0.02% to 0.9%, or 0.03% to 0.8%, or 0.04% to 0.7%, or 0.05% to 0.6%, preferably 0.5%, preferably 0.1% Ca(OH)$_2$, and a carrier, diluent or excipient. In one embodiment the carrier, excipient or diluent is an agriculturally acceptable carrier, excipient or diluent.

In one embodiment the combination consists of 10%, or 11%, or 12%, or 13%, or 14%, or 15%, or 16%, or 17%, or 18%, or 19%, or 20%, preferably 14% ammonium salt or complex ammonium salt, preferably NH$_4$NO$_3$, and 0.01% to 1%, or 0.02% to 0.9%, or 0.03% to 0.8%, or 0.04% to 0.7%, or 0.05% to 0.6%, preferably 0.5% CaO, preferably 0.1% and water.

In one embodiment the combination comprises or consists essentially of at least 0.01% and less than 1%, or at least 0.02% and less than 0.9%, or at least 0.03% and less than 0.8%, or at least 0.04% and less than 0.7%, or at least 0.05% and less than 0.6%, preferably at least 0.5% and less than 0.55% Ca(OH)$_2$.

In one embodiment the combination comprises or consists essentially of at least 0.01% and less than 1%, or at least 0.02% and less than 0.9%, or at least 0.03% and less than 0.8%, or at least 0.04% and less than 0.7%, or at least 0.05% and less than 0.6%, preferably at least 0.5% and less than 0.55% CaO.

In one embodiment the combination comprises or consists essentially of 10%, or 11%, or 12%, or 13%, or 14%, or 15%, or 16%, or 17%, or 18%, or 19%, or 20%, preferably 14% ammonium salt or complex ammonium salt, preferably NH$_4$NO$_3$, and at least 0.01% and less than 1%, or at least 0.02% and less than 0.9%, or at least 0.03% and less than 0.8%, or at least 0.04% and less than 0.7%, or at least 0.05% and less than 0.6%, preferably at least 0.5% and less than 0.55% Ca(OH)$_2$, preferably at least 0.1% and less than 0.55% Ca(OH)$_2$.

In one embodiment the combination comprises or consists essentially of 10%, or 11%, or 12%, or 13%, or 14%, or 15%, or 16%, or 17%, or 18%, or 19%, or 20%, preferably 14% ammonium salt or complex ammonium salt, preferably NH$_4$NO$_3$, and at least 0.01% and less than 1%, or at least 0.02% and less than 0.9%, or at least 0.03% and less than 0.8%, or at least 0.04% and less than 0.7%, or at least 0.05% and less than 0.6%, preferably at least 0.5% and less than 0.55% CaO, preferably at least 0.1% and less than 0.55% CaO.

In one embodiment the combination comprises or consists essentially of 14% ammonium salt or complex ammonium salt, preferably NH$_4$NO$_3$ and less than 0.5% Ca(OH)$_2$.

In one embodiment the combination comprises or consists essentially of 14% ammonium salt or complex ammonium salt, preferably NH$_4$NO$_3$ and less than 0.5% CaO.

In one embodiment the combination consists of 10%, or 11%, or 12%, or 13%, or 14%, or 15%, or 16%, or 17%, or 18%, or 19%, or 20%, preferably 14%, NH$_4$NO$_3$, and at least 0.01% and less than 1%, or at least 0.02% and less than 0.9%, or at least 0.03% and less than 0.8%, or at least 0.04% and less than 0.7%, or at least 0.05% and less than 0.6%, preferably at least 0.5% and less than 0.55% Ca(OH)$_2$, preferably at least 0.1% and less than 0.55% Ca(OH)$_2$, and a carrier, diluent or excipient. In one embodiment the carrier, excipient or diluent is an agriculturally acceptable carrier, excipient or diluent. In one embodiment the carrier, excipient or diluent is, or comprises a surfactant. In one embodiment the carrier, excipient or diluent is, or comprises water.

In one embodiment the combination consists of 10%, or 11%, or 12%, or 13%, or 14%, or 15%, or 16%, or 17%, or 18%, or 19%, or 20%, preferably 14%, NH$_4$NO$_3$, and at least 0.01% and less than 1%, or at least 0.02% and less than 0.9%, or at least 0.03% and less than 0.8%, or at least 0.04% and less than 0.7%, or at least 0.05% and less than 0.6%, preferably at least 0.5% and less than 0.55% CaO, preferably at least 0.1% and less than 0.55% CaO and water.

In one embodiment the combination is effective at controlling the egg stage, the larval stage and/or the adult stage of free living parasitic helminths, particularly free living parasitic nematodes. In one embodiment the combination is effective at controlling the first, the second, the third and/or the fourth larval stage of free living parasitic helminths, particularly free living parasitic nematodes.

In one embodiment the combination reduces the number of infective third stage larvae (L3) of the free living parasitic helminths, particularly of the free living parasitic nematodes at a treatment locus, upon contact, as compared to the number of L3 at a control locus.

In one embodiment the combination is effective at controlling free living parasitic helminths, particularly free living parasitic nematodes that are mammalian endoparasites.

In one embodiment the mammal is selected from the group consisting of canines, felines, bovines, ovines, cervines, caprines, porcines, lagomorphs, rodents, camelids and hominids.

In one embodiment the free living parasitic helminths are members of the Nematoda, Cestoda or Trematoda.

In one embodiment the free living parasitic helminths are Nematoda.

In one embodiment the Nematoda are in the superfamily Trichostrongyloidea, preferably the family Cooperiidae or the family Trichostrongylidae. In one embodiment the Nematoda are *Ostertagia* spp., *Teladorsagia* spp., *Haemonchus* spp. and *Cooperia* spp., preferably *O. ostertagi*, *T. circumcincta*, *H. contortus* and *C. oncophora*.

In one embodiment the Nematoda are selected from the group consisting of members of the order Strongylida (known as the bursate nematodes), particularly members of the superfamilies Ancylostomatoidea (hookworms), Strongyloidea (Strongyles), Trichostrongyloidea (Trichostrongyles and Metastrongyloidea (lungworms). In a particular embodiment the Nematoda are selected from the group consisting of the Strongyloidea and Trichostrongyloidea, particularly members of the genera *Ostertagia, Teladorsagia, Haemonchus, Trichostrongylus, Cooperia,* and *Oesophagostomum*.

In one embodiment the combination is for application to a treatment environment or to a treatment locus. In one embodiment the combination is formulated for application to a treatment environment or a treatment locus.

In one embodiment the treatment environment is a field, paddock, pasture, corral, roadside, right of way, or other open area where free living parasitic helminths, particularly free living parasitic nematodes are present, or may be present.

In one embodiment the treatment environment is a house, garage, shed, outbuilding, farm building, milking shed, barn, or other enclosed or partially enclosed structure where free living parasitic helminths, particularly free living parasitic nematodes are present, or may be present.

In one embodiment a treatment environment comprises a plurality of treatment loci.

In one embodiment a treatment locus is a surface on or in an article, material or substance present in a treatment environment. In one embodiment the surface is on a plant or part thereof, on the ground or soil or part thereof, on the materials that make up the ground or soil or part thereof, but not limited thereto.

In one embodiment the plant or part thereof is a forage or pasture plant or part thereof.

In one embodiment the plant or part thereof is a grass plant or part thereof.

In one embodiment the animal waste or part thereof is faeces and/or faeces comprised in effluent.

In one embodiment the surface comprises free living parasitic helminths, preferably free living parasitic nematodes, preferably at least one of the four larval stages of free living parasitic helminths, preferably of free living parasitic nematodes.

In one embodiment the combination further comprises a buffering agent. In one embodiment the buffering agent is a buffering agent that is safely used in agriculture. In one embodiment the buffering agent is an agriculturally acceptable buffering agent. Preferably the buffering agent is selected from group consisting of TAPS, Bicine, Tris, Tricine, TAPSO, HEPES, TES, MOPS, PIPES, and MES.

In one embodiment the combination comprises or consists essentially of an alkaline compound as described herein and a buffering agent as described herein. In one embodiment the alkaline compound comprises an alkaline earth metal. Preferably the alkaline earth metal is selected from the group consisting of beryllium, magnesium, calcium, strontium, barium and, preferably calcium or magnesium, preferably calcium. In one embodiment the alkaline earth metal is a hydroxide or oxide. Preferably the hydroxide or oxide is calcium hydroxide or calcium oxide. In one embodiment the alkaline compound comprises a transitional metal, preferably zinc or copper. In one embodiment the alkaline compound is selected from the group consisting of calcium hydroxide, calcium oxide, magnesium hydroxide, zinc hydroxide, copper hydroxide, cobalt hydroxide and magnesium oxide. In one embodiment the alkaline compound comprises an alkali metal. Preferably the alkali metal comprises caesium, lithium, sodium or potassium. Preferably the alkaline compound is lithium hydroxide (LiOH), sodium hydroxide (NaOH) or potassium hydroxide (KOH).

In one embodiment the combination consists of an alkaline compound as described herein, a buffering agent as described herein and a carrier, diluent or excipient. In one embodiment the alkaline compound comprises an alkaline earth metal. Preferably the alkaline earth metal is selected from the group consisting of beryllium, magnesium, calcium, strontium, barium and, preferably calcium or magnesium, preferably calcium. In one embodiment the alkaline earth metal is a hydroxide or oxide. Preferably the hydroxide or oxide is calcium hydroxide or calcium oxide. In one embodiment the alkaline compound comprises a transitional metal, preferably zinc or copper. In one embodiment the alkaline compound is selected from the group consisting of calcium hydroxide, calcium oxide, magnesium hydroxide, zinc hydroxide, iron oxide, copper hydroxide, cobalt hydroxide and magnesium oxide. In one embodiment the alkaline compound comprises an alkali metal. Preferably the alkali metal comprises caesium, lithium, sodium or potassium. Preferably the alkaline compound is LiOH, NaOH or KOH.

In one embodiment the combination has a pH greater than about 6.5 but less than about 9.5, preferably greater than about 7 but less than about 9, preferably greater than about 7 but less than about 8.5, preferably greater than about 7 but less than about 8, preferably greater than about 7 but less than about 7.5, preferably about 7.

In one embodiment the combination has a pH of about 6.5 to about 9.5, preferably about 7 to about 9, preferably about 7 to about 8.5, preferably about 7 to about 8, preferably about 7 to about 7.5, preferably about 7.

In one embodiment the combination has a pH of 6.5 to 9.5, preferably 7 to 9, preferably 7 to 8.5, preferably 7 to 8, preferably 7 to 7.5, preferably 7.

In one embodiment the combination comprises one or more additional carriers, diluents or excipients. In one embodiment the additional carriers, diluents or excipients are selected from the group consisting of wetting agents, surfactants, anti-caking agents, osmotic protection agents, and dispersing agents.

In one embodiment the additional carriers, diluents or excipients is, or comprises a surfactant.

In one embodiment the combination comprises one or more additional active agents. In one embodiment the additional active agent is selected from the group consisting of anti-scorching agents, osmotic protection agents, nitrification inhibitors, urease inhibitors, pesticides, insecticides, plant and insect growth regulators, trace elements for plants and animals, plant nutrients, soil conditioners, soil nutrients, and bio-control agents. In one embodiment the anti-scorching agent is betaine trimethylglycine.

In one embodiment the trace element is selected from the group consisting of Cu, Fe, and Zn.

In one embodiment the combination upon application to a treatment environment or treatment locus, provides <2 kgN/hectacre to >20 kgN/hectacre.

In one embodiment the combination upon application to a treatment environment or treatment locus, provides about 2-3, preferably 2-3 kg betaine trimethylglycine/hectacre.

In one embodiment the combination is a composition. In one embodiment the combination or the composition is an anthelmintic.

In one embodiment the combination or composition is formulated for direct application or indirect application to a treatment environment or treatment locus. In one embodiment the combination or composition is in the form of a powder, liquid, slurry, spray, mist, aerosol, micro aerosol, or gel.

In one embodiment the combination or the composition is formulated for simultaneous application of the alkaline compound and the ammonium compound, preferably calcium hydroxide and the ammonium nitrate, to a treatment environment or treatment locus.

In one embodiment the combination or composition is formulated for, or is in a form that provides controlled release of the alkaline compound and/or ammonium compound. In one embodiment controlled release comprises release of the alkaline compound and/or the ammonium compound over at least 30 days, preferably at least 25 days, preferably at least 20 days, preferably at least 15 days, preferably at least two weeks, preferably at least 10 days, preferably at least one week, preferably at least 5 days, preferably at least 4 days, preferably at least three days, preferably at least two days, preferably release is over at least one day.

Methods of Controlling Free Living Parasitic Helminths

The inventors believe that they are the first to demonstrate a method of controlling free living parasitic helminths, particularly free living parasitic nematodes, in a treatment environment using a combination of calcium hydroxide and ammonium nitrate. Without wishing to be bound by theory, the inventors believe that through the use of the method disclosed herein, practitioners will be able to reduce frequency and severity of parasitic helminth infections in various domestic and farm animals by controlling the free living states of relevant parasitic helminths, particularly nematodes.

Accordingly, in another aspect the invention relates to a method of controlling free living stages of the parasitic helminths in a treatment environment comprising applying a combination or composition of the invention to the treatment environment.

In another aspect the invention relates to a method of controlling free living parasitic helminths at a treatment locus comprising contacting a treatment locus, or at least one free living parasitic helminth at a treatment locus, with a combination or composition of the invention.

In one embodiment the treatment environment is a field, paddock, pasture, corral, roadside, right of way, or other open area where free living parasitic helminths, particularly free living parasitic nematodes are present, or may be present.

In one embodiment the treatment environment is a house, garage, shed, farm building, outbuilding, milking shed, barn, or other enclosed or partially enclosed structure where free living parasitic helminths, particularly free living parasitic nematodes are present, or may be present.

In one embodiment a treatment environment comprises a plurality of treatment loci.

In one embodiment a treatment locus is a surface on or in an article, material or substance present in a treatment environment. In one embodiment the surface is on a plant or part thereof, on animal waste or part thereof, on the ground or soil or part thereof, on the materials that make up the ground or soil or part thereof, but not limited thereto.

In one embodiment the plant or part thereof is a forage or pasture plant or part thereof.

In one embodiment the plant or part thereof is a grass plant or part thereof.

In one embodiment the animal waste or part thereof is faeces and/or faeces comprised in effluent.

In one embodiment the surface comprises free living parasitic helminths, preferably free living parasitic nematodes, preferably at least one of the four larval stages of free living parasitic helminths, preferably of free living parasitic nematodes. In one embodiment the surface comprises the eggs of free living parasitic helminths.

In one embodiment applying the combination or composition of the invention to the treatment environment comprises contacting a plurality of treatment loci within the treatment environment with the combination or composition. In one embodiment the treatment locus is a surface in the treatment environment where a free living parasitic helminth, particularly a free living parasitic nematode, is commonly found, is expected to be found, or where control of free living parasitic helminths, particularly free living parasitic nematodes, is desired.

In one embodiment contacting comprises directly contacting at least one treatment locus within the treatment environment with the combination or composition.

In one embodiment applying the combination or composition of the invention to a treatment environment comprises contacting at least one free living parasitic helminth, preferably at least one free living parasitic nematode, within the treatment environment with the combination or composition. In one embodiment the free living parasitic helminths, particularly the free living parasitic nematodes, are present at a treatment locus.

In one embodiment contacting at least one free living parasitic helminth, particularly at least one free living parasitic nematode, with a combination or composition of the invention comprises contacting for a sufficient time to allow the combination or composition of the invention to control the free living parasitic helminths at a treatment locus.

In one embodiment applying comprises directly or indirectly applying the combination or composition of the invention to a treatment environment. In one embodiment applying is directly applying. In one embodiment applying is indirectly applying.

In one embodiment applying comprises applying the combination or composition of the invention to a treatment environment at least two times.

The timing of the application of the combination or composition to the treatment environment will vary depending on a number of factors related to the environment to be treated. For example, where a pasture is the treatment environment, the timing of treatment will vary based on factors that will be familiar to the pasture manager or farmer such as the time of year, level of precipitation, and type of livestock previously and/or currently grazing the pasture, but not limited thereto. Selecting the appropriate timing for applying a combination or composition of the invention to a pasture to reduce the numbers of parasitic free living helminths is believed to be within the skill of a person in the art based on their particular knowledge of the environment to be treated.

As the reader will no doubt appreciate, one main point of difference between a combination or composition of the invention that is an anthelmintic and known anthelmintic compositions or combinations lies in the external application of the combination or composition of the invention to the environment in which free living parasitic forms of helminths are found. This is in sharp contrast to anthelmintic compositions and/or combinations know in the art, and to methods of treating parasitic helminths of livestock as known in the art, both of which are directed to internal use in an affected animal.

In one embodiment the combination comprises or consists essentially of an alkaline compound as described herein and an ammonium compound as described herein wherein the ratio of the alkaline compound to the ammonium compound is a ratio that provides the combination at a pH of greater than about 6.5 but less than about 9.5, preferably greater than about 7 but less than about 9, preferably greater than about 7 but less than about 8.5, preferably greater than about 7 but less than about 8, preferably greater than about 7 but less than about 7.5, preferably about 7, when the combination comprises a carrier, diluent or excipient.

In one embodiment the combination comprises or consists essentially of an alkaline compound as described herein and an ammonium compound as described herein wherein the ratio of the alkaline compound to the ammonium compound is a ratio that provides the combination at a pH of greater than about 6.5 but less than about 9.5, preferably greater than about 7 but less than about 9, preferably greater than about 7 but less than about 8.5, preferably greater than about 7 but less than about 8, preferably greater than about 7 but less than about 7.5, preferably about 7, when the combination is provided in solution.

In one embodiment the pH is about 6.5 to about 9.5, preferably about 7 to about 9, preferably about 7 to about 8.5, preferably about 7 to about 8, preferably about 7 to about 7.5, preferably about 7.

In one embodiment pH is 6.5 to 9.5, preferably 7 to 9, preferably 7 to 8.5, preferably 7 to 8, preferably 7 to 7.5, preferably 7.

In one embodiment the combination comprises or consists essentially of $(Ca(OH)_2):NH_4NO_3$ that is 0.01% w/w (1.35 mM) $(Ca(OH)_2)$:1.5% w/w (187.5 mM) $NH_4NO_3$.

In one embodiment the combination comprises or consists essentially of $(Ca(OH)_2):NH_4NO_3$ that is 0.1% w/w (13.5 mM) $(Ca(OH)_2)$:14% w/w (1750 mM) $NH_4NO_3$.

In one embodiment the combination comprises or consists essentially of $(Ca(OH)_2):NH_4NO_3$ that is 0.20% w/w (27 mM) $(Ca(OH)_2)$:28% w/w (3500 mM) $NH_4NO_3$.

A skilled worker will appreciate that the combination or composition of the invention may comprise or consist essentially of any concentration of $Ca(OH)_2$ between 0.1 mM and 2.5 mM and any concentration of $NH_4NO_3$ 18 mM and 350 mM that provides a ratio of $(Ca(OH)_2):NH_4NO_3$ that provides the combination or composition, when comprised in a carrier, diluent or excipient, at a pH of greater than about 6.5 but less than about 9.5, preferably greater than about 7 but less than about 9, preferably greater than about 7 but less than about 8.5, preferably greater than about 7 but less than about 8, preferably greater than about 7 but less than about 7.5, preferably about 7, when the combination or composition is provided in solution.

A skilled worker will also appreciate that the combination or composition of the invention may be formulated with a ratio of an alkaline compound as described herein to an ammonium compound as described herein that is equivalent to the ratio of $Ca(OH)_2:NH_4NO_3$ that provides the combination or composition when comprised in a carrier, diluent or excipient, at a pH of greater than about 6.5 but less than about 9.5, preferably greater than about 7 but less than about 9, preferably greater than about 7 but less than about 8.5, preferably greater than about 7 but less than about 8, preferably greater than about 7 but less than about 7.5, preferably about 7, when the combination or composition is provided in solution.

In one embodiment the pH is about 6.5 to about 9.5, preferably about 7 to about 9, preferably about 7 to about 8.5, preferably about 7 to about 8, preferably about 7 to about 7.5, preferably about 7.

In one embodiment pH is 6.5 to 9.5, preferably 7 to 9, preferably 7 to 8.5, preferably 7 to 8, preferably 7 to 7.5, preferably 7.

In another aspect the invention relates to the use of an alkaline compound and an ammonium compound to control free living parasitic helminths, preferably free living parasitic nematodes.

In another aspect the invention relates to the use of a combination or a composition of the invention to control free living parasitic helminths, preferably free living parasitic nematodes.

In some embodiments of the uses, free living parasitic helminths, particularly free living parasitic nematodes, are controlled in a treatment environment, at a treatment locus, or at a plurality of treatment loci.

In some embodiments of the uses, the treatment environment is a field, paddock, pasture, corral, roadside, right of way, or other open area where free living parasitic helminths, particularly free living parasitic nematodes are present, or may be present.

In some embodiments of the uses, the treatment environment is a house, garage, shed, farm building, outbuilding, milking shed, barn, or other enclosed or partially enclosed structure where free living parasitic helminths, particularly free living parasitic nematodes are present, or may be present.

In some embodiments of the uses, the treatment environment comprises a plurality of treatment loci.

In some embodiments of the uses, a treatment locus is a surface on or in an article, material or substance present in a treatment environment. In some embodiments of the uses, the surface is on a plant or part thereof, on an animal or part thereof, on animal waste or part thereof, on the ground or soil or part thereof, on the materials that make up the ground or soil or part thereof, but not limited thereto.

In some embodiments of the uses, the plant or part thereof is a forage or pasture plant or part thereof. In some embodiments of the uses, the plant or part thereof is a grass plant or part thereof.

In some embodiments of the uses, the animal waste or part thereof is effluent, faeces and/or faeces comprised in effluent.

In some embodiments of the uses, the surface comprises free living parasitic helminths, preferably free living parasitic nematodes, preferably at least the eggs and three free living stages of the parasitic helminths, preferably of free living parasitic nematodes.

In some embodiments of the uses, use of the alkaline compound and the ammonium compound or use of the combination or composition of the invention to control free living parasitic helminths, particularly free living parasitic nematodes, comprises contacting a plurality of treatment loci within the treatment environment with the alkaline compound and the ammonium compound, or with the combination or composition of the invention. In some embodiments of the uses, the treatment locus is a surface in the treatment environment where a free living parasitic helminth, particularly a free living parasitic nematode, is commonly present, is expected to be present, or where control of free living parasitic helminths, particularly free living parasitic nematodes, is desired.

In some embodiments of the uses, contacting comprises directly contacting at least one treatment locus within the treatment environment with the alkaline compound and the ammonium compound, or with the combination or composition of the invention.

In some embodiments of the uses, contacting comprises contacting at least one free living parasitic helminth, particularly at least one free living parasitic nematode, with an alkaline compound and an ammonium compound, or with a combination or composition of the invention, wherein the contacting is for a sufficient time to allow the combination or composition of the invention to control the free living parasitic helminths at a treatment locus.

In some embodiments of the uses, contacting comprises applying the alkaline compound and the ammonium compound, or the combination or composition of the invention to a treatment environment. In some embodiments of the uses, applying comprises applying the alkaline compound and the ammonium compound simultaneously, wherein the alkaline compound and the ammonium compound are applied at a ratio of calcium hydroxide or calcium oxide to ammonium salt or complex ammonium salt, preferably ammonium nitrate as described herein.

In some embodiments of the uses of the invention applying comprises applying a combination or composition of the invention one or more times to a treatment environment, or to at least one treatment locus comprised in a treatment environment.

In some embodiments of the methods and uses of the invention, applying comprises applying a combination or composition of the invention at least 1×, or 2×, or 3×, or 4×, or 5×, or 6×, or 7×, or 8×, or 9×, or 10×, or 11× or 12× or more, preferably at least 1× to per year, preferably at least 1× per 6 months, preferably at least 1 time per 3 months, preferably at least one time per 2 months, preferably at least once per month.

In another aspect the invention relates to a method of making a combination or composition of the invention as described herein, the method comprising formulating an alkaline compound and an ammonium compound as described herein to make an anthelmintic as described herein, wherein the anthelmintic is effective at controlling free living parasitic helminths, preferably free living parasitic nematodes, at one or more treatment loci.

In one embodiment the ratio of the alkaline compound to the ammonium compound in the anthelmintic is 0.1% w/w: 14% w/w. In one embodiment the alkaline compound is calcium hydroxide or calcium oxide and the ammonium compound is an ammonium salt or a complex ammonium salt, preferably ammonium nitrate.

In one embodiment the anthelmintic comprises or consists essentially of:
  a) 0.1% calcium hydroxide or calcium oxide, and
  b) 14% ammonium nitrate.

The invention will now be described by way of the following representative methods and examples which are provided to further illustrate the subject matter to which the invention relates. The use of any and all examples, or exemplary language (e.g., "such as" or "including") provided herein, is intended solely for the purposes of better describing the invention. The presence of examples and the use of exemplary language does not limit the scope of the invention as disclosed herein unless specifically otherwise indicated. No language used in the entirety of the disclosure of this application should be interpreted as indicating that any particular element or feature pertaining to the invention and as disclosed herein is essential to the practice of the invention, unless explicitly stated. For example, the skilled worker will be able to modify the quantities of reagents and processing times in the methods and processes as exemplified, as known in the art, according to the inventive concepts disclosed herein. Such modifications are considered to be within the scope of the present invention.

EXAMPLES

Experimental Program

The experimental programme included both a laboratory and a field study. The laboratory study investigated the efficacy of combinations of an alkali and ammonium against L3. The field study investigated the efficacy of an alkali and ammonium applied alone or as a combination, and also whether the actives were effective under field conditions.

Example 1—In Vitro Efficacy

Methodology
Laboratory Study

To explore the potential interactions between an alkali and ammonium a 4×4 factorial petri-dish study with 10 replicates (160 samples) was established using calcium hydroxide $(Ca(OH)_2)$ at 4 concentrations (0%, 0.013%, 0.025%, 0.05%) and ammonium nitrate $(NH_4NO_3)$ at 4 concentrations (0%, 1.75%, 3.5%, 7.0%). Two additional treatments $(Ca(OH)_2$ 0.1%, $NH_4NO_3$ 13.5%) were also included to provide a reference to previous studies done by the inventors. This laboratory study was conducted from the 4-12 Apr. 2016. (Day 1-4 Apr. 2016-3 reps, Day 2-5 Apr. 2016-4 reps, Day 3-6 Apr. 2016-3 reps)

The effectiveness of each active (both alone and in combination) was evaluated at one sampling date, with the variation in effectiveness between the 10 replicates within each single treatment used to calculate a 95% confidence interval for the expected efficacy of the combination assuming additive efficacy. If the mean for the combination fell outside these limits it was assumed to be significantly different.

For the petri dish studies the test solutions were made up the day before the study started, and were stored in air tight containers until used. The test solutions included calcium hydroxide $(Ca(OH)_2)$ at 4 concentrations (0%, 0.013%, 0.025%, 0.05%) and ammonium nitrate $(NH_4NO_3)$ at 4 concentrations (0%, 1.75%, 3.5%, 7.0%). Two additional treatments $(Ca(OH)_2$ 0.1%, $NH_4NO_3$ 13.5%) were also included to provide a reference to previous studies done by the inventors. Changes in the pH of the solution were monitored over the first 24 hours (Table 1). A total of 24 ml of the appropriate solution was added to each petri dish and the dish lids replaced.

TABLE 1

Changes in the pH of solutions immediately after mixing (0 hours) and after 24 hours.

| $Ca(OH)_2$ | | $NH_4NO_3$ | | | | |
|---|---|---|---|---|---|---|
| | | 0 | 1.75 | 3.5 | 7 | 14 |
| 0 | pH 0 | 7.2 | 6.6 | 6.4 | 6.3 | 5.9 |
| | pH 24 | 7.4 | 6.5 | 6.6 | 6.1 | 5.7 |
| 0.013 | pH 0 | 11.0 | 7.7 | 7.4 | 7.2 | |
| | pH 24 | 9.0 | 7.2 | 7.1 | 7.1 | |
| 0.025 | pH 0 | 11.3 | 8.0 | 7.7 | 7.5 | |
| | pH 24 | 10.5 | 7.8 | 7.3 | 7.2 | |
| 0.05 | pH 0 | 11.6 | 8.3 | 8 | 7.8 | |
| | pH 24 | 10.0 | 7.6 | 7.9 | 7.1 | |
| 0.1 | pH 0 | 12.0 | | | | |
| | pH 24 | 11.9 | | | | |

The pH range (7.1-8.3) that was found across all 9 combinations (Table 1) indicates that the dominant N form in solution would have been the ammonium cation $(NH_4^+)$. At pH 7.0 99.9% of N in solution is in the ammonium form. At pH of 9.25 this drops to 50%.

Efficacy Testing

*Haemonchus controtus* L3 were added to each dish. The petri dishes was conducted from the 4-12 Apr. 2016. (Day 1-4 Apr. 2016-3 reps, Day 2-5 Apr. 2016-4 reps, Day 3-6 Apr. 2016-3 reps) at each sampling date live larvae were extracted from the test solution using small Baermann funnels containing approximately 250 ml of water, a course sieve, and a single layer of paper tissue. The petri dishes were emptied and rinsed into the funnels on top of the tissue and left to sit for a minimum of 18 hours (overnight). During this period any L3 surviving the treatments moved through the tissue and sieve and were concentrated in the base of the funnel from where they were collected in 50 ml tubes. The tubes were left upright to settle overnight in the fridge prior to syphoning to 10 ml and counting the larvae present in chambered slides on a compound microscope. (Mackay, A., Leathwick, D., Theobald, P, Waghorn t. 2014 Reducing infective parasite larvae on pasture. Report RE500/2014/090 for Ballance Agri nutrients 15 pp.)

Results

The two additional treatments $(Ca(OH)_2$ 0.1%, $NH_4NO_3$ 13.5%) to the 4×4 factorial, positive controls, were both effective in killing L3 as in a previous study by the inventors (Table 2a). The tap water control had no effect with 100% L3 survival observed.

TABLE 2

(a) Measured efficacy of the two actives alone at each of 4 concentrations and as combinations. The additional treatments $(Ca(OH)_2$ 0.1%, $NH_4NO_3$ 13.5%) are there as a reference to the previous study.

| (a) Measured efficacy | | $NH_4NO_3$ | | | | |
|---|---|---|---|---|---|---|
| | (%) | 0 | 1.75 | 3.5 | 7 | 13.5 |
| $Ca(OH)_2$ | 0 | 0 | −39 | 12 | 72 | 97 |
| | 0.013 | 28 | −23 | 8 | 86 | ND |
| | 0.025 | 43 | 0 | 14 | 84 | ND |
| | 0.050 | 69 | 41 | 30 | 91 | ND |
| | 0.100 | 93 | ND[1] | ND | ND | ND |

ND = Not Detemined.
Assumed 100% efficacy in killing parasites based on earlier study (Mackay Ad, Leathwick, D. pers. comm.)

The results in Table 2 illustrate that the combination of $Ca(OH)_2$ at 0.013% and $NH_4NO_3$ is as effective at killing free-living parasitic helminths as $Ca(OH)_2$ 0.013% alone while providing a pH within a range that is well tolerated by plants.

Example 2—Efficacy Under Field Conditions

Methodology

The field study included five treatments
1. tap water
2. 14% ammonium nitrate
3. 0.10% calcium hydroxide
4. 14% ammonium nitrate and 0.10% calcium hydroxide
5. 28% ammonium nitrate and 0.50% calcium hydroxide The treatments were replicated 8 times in a randomized block design.

All treatments were applied at an application rate of 250 L/ha (25 ml/1 $m^2$ plot) using a small spray bottle. Treatments were applied at 11:00 am on the 28 Apr. 2016. The pH of the solutions approximately 30 minutes after treatment application were; Treatment 1, pH 7.12, pH 6.0, 3 pH 11.9, 4 pH 7.9, 5 pH 8.4.

Before the study was initiated the trial area was mowed, marked out and sheep dung containing *Haemonchus contortus* applied to the center of each of the 40 plots. The sheep dung was applied 6 weeks before start of the study. Just prior to the application of the treatments, L3 numbers were counted, to ensure there were sufficient larvae present. The impact of all five treatments on plant tissue health (leaf damage) of the predominantly ryegrass white clover pasture, was assessed 4.5 hrs after application of the treatments and again after 48 hours, and at 4 days (both pre and post-harvest).

Plot size was one meter square. Soil moisture and rainfall were recorded as part of the study. There was very little rainfall during the period of the study, with soil volumetric moisture content averaging 30% on day 1.

Results

Pasture Color and Legume Damage

Figure 1:
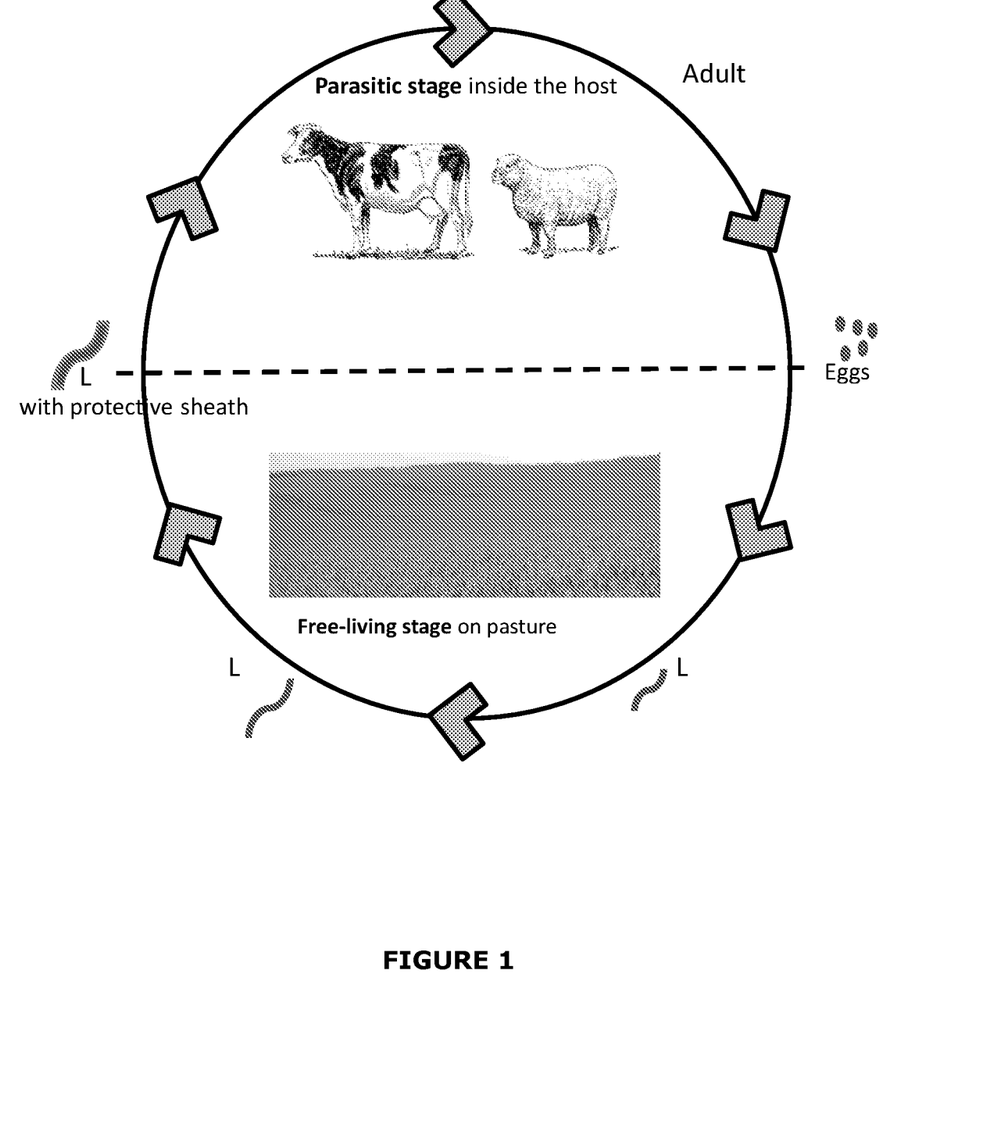
FIG. 1. Stages of the parasite life cycle. In order to transition from the free-living (non-parasitic) life stage to a parasitic existence within the abomasum of small intestine of their host, the parasite larva (L3) needs to rapidly adapt to the host environment by ex-sheathing and taking up residence in their host.
Figure 2:
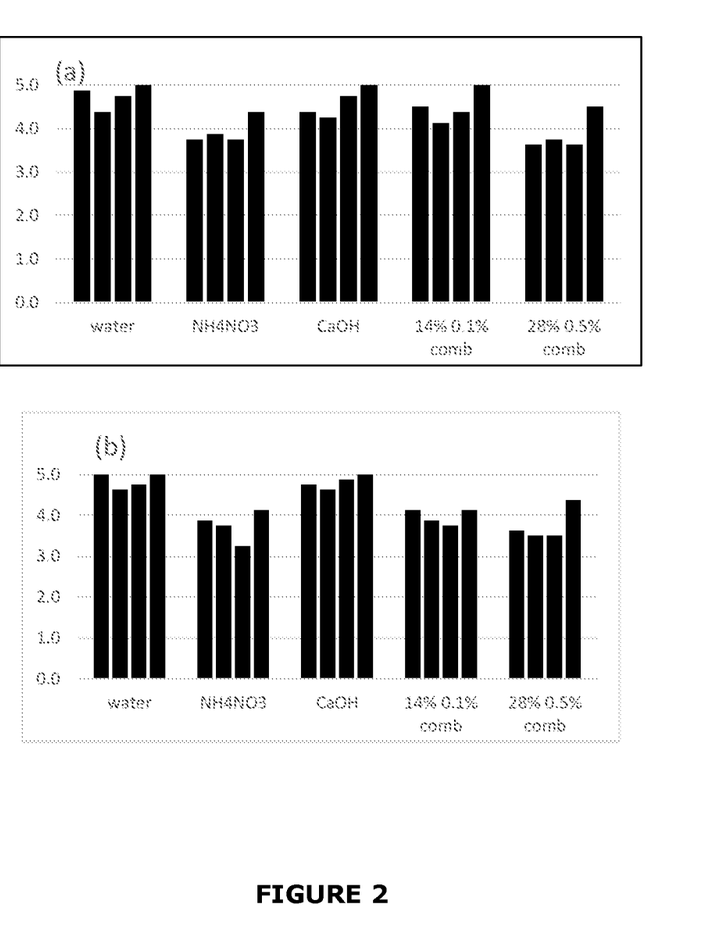
FIG. 2. Pasture (a) colour and (b) legume damage 4.5 hours, 48 hours and at 4 days pre and post-harvest.

Ammonium nitrate alone had a greater impact on pasture colour and legume leaf health than calcium hydroxide (FIG. 2). There was little rainfall during the study period with soil moistures at the time of the field study at 30%. The greatest concentration of actives applied in the combination (treatment 5) had no more impact on pasture colour or legume damage than ammonium nitrate alone, which was only applied at half the concentration. Most of the swards treated started to recover from any initial leaf damage by day 4.

Efficacy Against Free Living Parasitic Helminths

Figure 3:
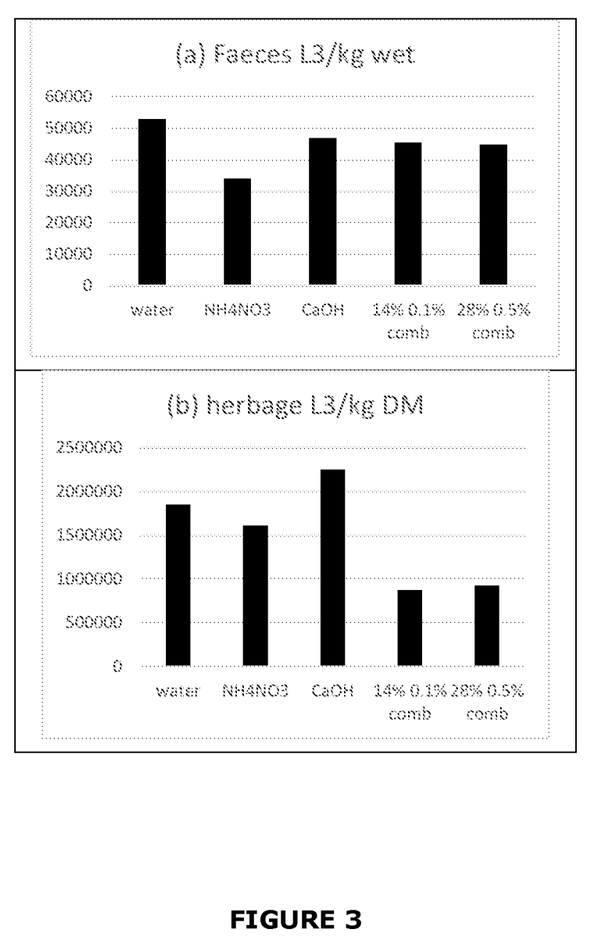
FIG. 3. Numbers of L3 recovered in (a) faeces and from (b) pastures when plots were treated with ammonium nitrate or calcium hydroxide alone or in combination.
Figure 4:
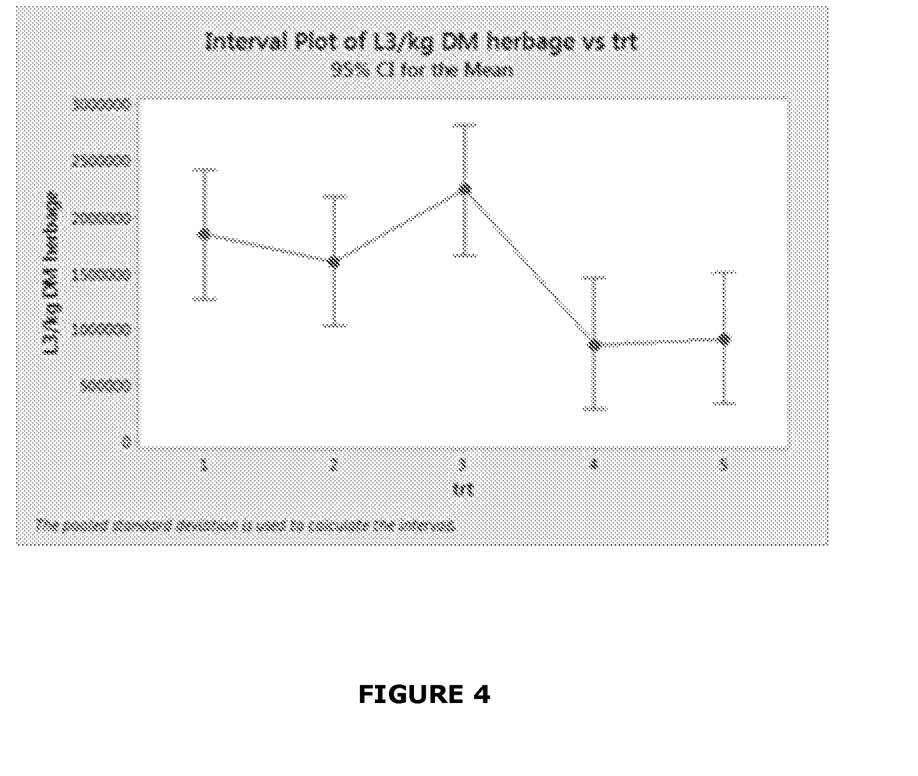
FIG. 4. Means and variance around the mean for the five treatments in FIG. 3b.
Figure 5:
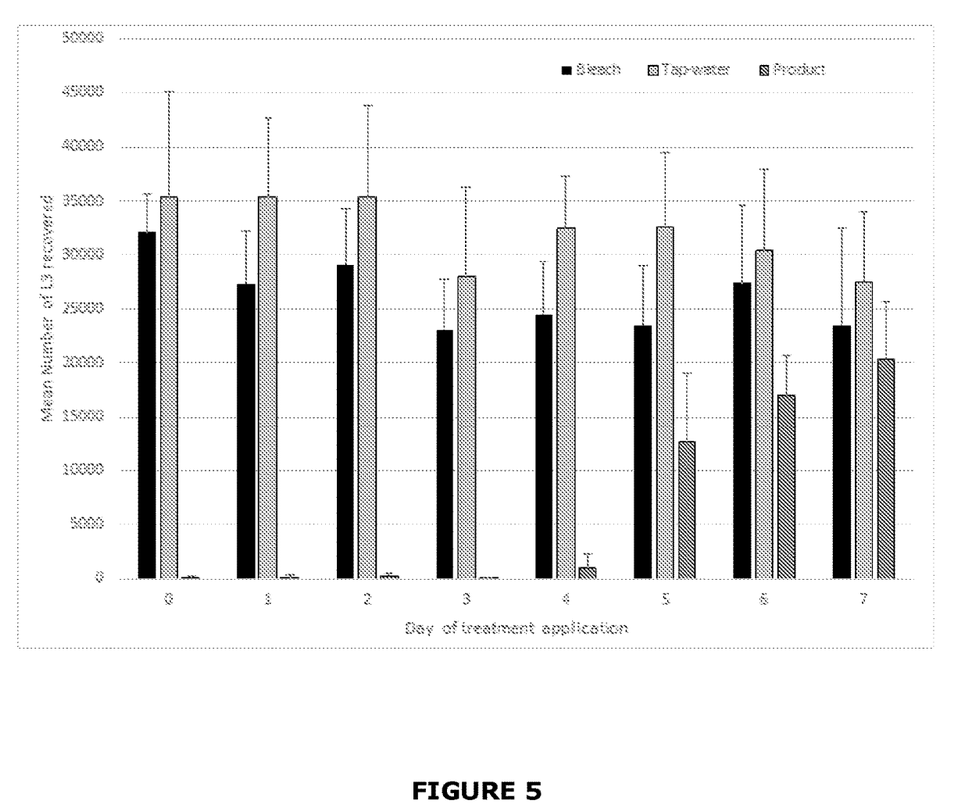
FIG. 5. Mini dung egg hatch and survival assay set out in Example 3, showing the efficacy of a composition as described herein for killing free-living parasitic helminths, particularly free living parasitic nematodes, on dung.

Neither ammonium nitrate nor calcium hydroxide applied alone or in combination had any impact on L3 numbers in faeces (FIG. 3a). Similarly neither ammonium nitrate nor calcium hydroxide applied alone had any impact on L3 numbers on pasture (FIG. 3b) In contrast the two combinations of ammonium nitrate and calcium hydroxide used in treatments 4 and 5 had a sizeable (59% and 61%, respectively) impact on L3 numbers recovered from pasture treated with these products (FIG. 3b). Additionally, L3 numbers on the pastures treated with the two combination treatments 4 or 5 were significantly lower than the L3 numbers on the pasture treated with calcium hydroxide alone (FIG. 4).

Example 3—Mini Dung Egg Hatch-Survival Assays

Approach

Treatments were applied in triplicate to fresh dung on days 0 through day 7 (On day 0 there would have only been eggs and by day 7 a large proportion of the eggs would have hatched and developed to the L3 stage). All the dung samples were then left until day 12 when the first replicates were harvested. The last replicate was sampled on day 16. Hatched larvae were separated from the dung and numerated via microscopic examination.

Treatments

Tap-Water

Town supply tap water was used for solution preparation and used as the reference control treatment.

Bleach

Sodium hypochlorite was added to tap-water to form a bleach solution containing 5% w/v NaOCl.

Composition Tested:

Calcium hydroxide was added to a 14% w/v ammonium nitrate solution to form a solution containing 0.1% w/v $Ca(OH)_2$ (0.54 g/L Ca), 14% w/v ammonium nitrate (49 g/L N) solution with a resulting pH of 7.77.

Results

Bleach had a small impact on all stage of the nematode development from the egg through to the L1, 2 and 3 stages, whereas the composition tested destroyed all the eggs and early larval stages of larvae in the dung (days 0-4) and also had a small impact on the L3 stage in the dung (Day 7). It is believed that the decline in the recovery of L3 with time may reflect the fact that the cultures were not watered until the treatments were applied. The above demonstrates that a composition according to the invention has efficacy against the nematode egg and early larval stages of larvae in the dung.

Example 4—Egg Hatch Assay

Approach

Approximately 125 eggs were place in 24 well plate wells and treatments applied. After 24 hours, unhatched eggs and larvae were numerated by microscopic examination.

Treatments

Tap-Water

Town supply tap water was used for solution preparation and used as the reference control treatment Bleach Sodium hypochlorite was added to tap-water to form a bleach solution containing 5% w/v NaOCl Composition Tested:

Calcium hydroxide was added to a 14% w/v ammonium nitrate solution to form a solution containing 0.1% w/v $Ca(OH)_2$ (0.54 g/L Ca), 14% w/v ammonium nitrate (49 g/L N) solution with a resulting pH of 7.77.

Results for Egg Hatch Assay

TABLE 3

| Treatments | Average of eggs | Average of larvae | Average of % hatch |
| --- | --- | --- | --- |
| Bleach | 0.3 | 0.0 | 0.0 |
| Tap-water | 3.2 | 121.6 | 97.5 |
| Composition tested | 34.4 | 0.0 | 0.0 |

Table 3 shows:

Bleach destroyed all the eggs

Tap water had no effect

The composition tested prevented egg hatching. Of the eggs counted (34.4) a large percentage appeared damaged. The inventors believe that this result explains why there were no larvae counted.

Results

The results presented in this example support the previous findings of the inventors as described in Example 3 and demonstrate that a composition of the invention has good efficacy against eggs and early larval stages of free-living parasitic helminths, particular free-living parasitic nematodes.

Example 5—Efficacy on Pasture and in Dung

Objective.

Evaluate the efficacy of the candidate product on L3 numbers on pasture and in dung.

Approach

Pasture turfs (30 cm×30 cm) collected from the field were placed in trays under cover in a tunnel house to remove rainfall as a factor influencing the efficacy of the composition described herein. There were three treatments (control, the composition tested applied once and the composition tested applied twice), with 10 replicates.

Composition tested: Calcium hydroxide was added to a 14% w/v ammonium nitrate solution to form a solution containing 0.1% w/v Ca(OH)2 (0.54 g/L Ca), 14% w/v ammonium nitrate (49 g/L N) solution with a resulting pH of 7.77.

A dung pat contaminated with free-living parasitic helminths was placed in the middle of each pasture turf 2 weeks prior to the application of the composition tested as described herein. Five days after the products were applied and two days before they were harvested all pasture turfs were watered (simulated rainfall) using the tunnel house sprinkler system. The study was conducted from August through to October 2017

Results

Figure 6:
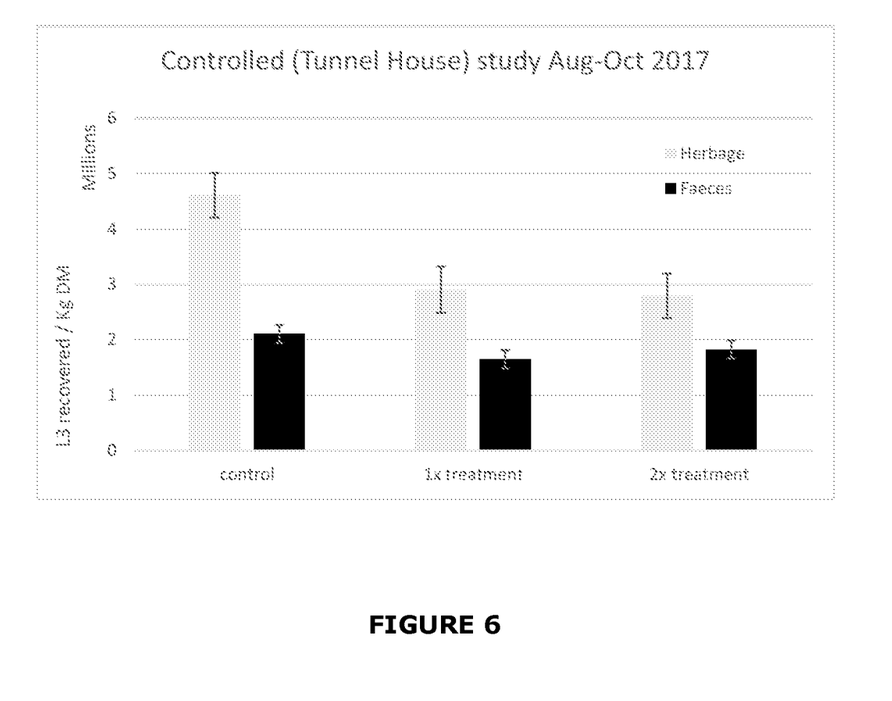
FIG. 6. Mean L3 numbers recovered and variance around the means recovered from pasture and faeces 7 days after application of the composition as described herein.

The composition tested as described herein had a significant effect on L3 numbers on pasture (FIG. 6). No dose effects were observed in this assay. On average L3 numbers on pastures treated with the composition tested were 63% of control, a 38% reduction. No reduction in L3 numbers in dung was observed under these particular assay conditions (FIG. 6).

The inventors also note that during their initial study they identified that the numbers of L3 recovered from the pastures were a factor higher than would normally be found in their experience on pastures at this time of the year.

It is not the intention to limit the scope of the invention to the abovementioned examples only. As would be appreciated by a skilled person in the art, many variations are possible without departing from the scope of the invention (as set out in the accompanying claims).

What we claim is:

1. An anthelmintic formulation comprising an alkaline compound and an ammonium compound, wherein the alkaline compound comprises $Ca(OH)_2$ or CaO and is present at a concentration of from 0.01-1.0% w/v, and wherein the ammonium compound comprises $NH_4NO_3$ or $(NH_4)_2CO_3$ and is present at a concentration of from 10-28% w/v,
wherein the formulation further comprises an agriculturally acceptable buffering agent, selected from group consisting of TAPS, Bicine, Tris, Tricine, TAPSO, HEPES, TES, MOPS, PIPES, and MES, and
wherein the formulation has a pH greater than 6.5 but less than 9.5.

2. The formulation of claim 1 further comprising a carrier, diluent or excipient.

3. The formulation of claim 1, wherein the formulation is in aqueous form.

4. The formulation of claim 1, wherein the formulation is effective at controlling free living parasitic helminths upon contact.

5. The formulation of claim 1, wherein the alkaline compound is calcium oxide.

6. The formulation of claim 1, wherein the alkaline compound is calcium hydroxide.

7. The formulation of claim 1, wherein the formulation comprises at least 10% w/v $NH_4NO_3$ or $(NH_4)_2CO_3$.

8. The formulation of claim 1, wherein the formulation comprises at least 14% w/v $NH_4NO_3$ or $(NH_4)_2CO_3$.

9. The formulation of claim 1, wherein the formulation comprises about 0.1% to about 0.5% w/v $Ca(OH)_2$ or CaO.

10. The formulation of claim 1, wherein the formulation has a pH greater than 7 but less than 9.

11. The formulation of claim 1 further comprising one or more additional active agents, selected from the group consisting of anti-scorching agents, osmotic protection agents, nitrification inhibitors, urease inhibitors, pesticides, insecticides, plant and insect growth regulators, trace elements for plants and animals, plant nutrients, soil conditioners, soil nutrients, and bio-control agents.

12. The formulation of claim 11 wherein the additional active agent is an anti-scorching agent.

13. A method of controlling free living stages of parasitic helminths in a treatment environment comprising applying a formulation of claim 1 to the treatment environment.

14. The method of claim 13, wherein the treatment environment is a house, garage, shed, farm building, outbuilding, milking shed, barn, or other enclosed or partially enclosed structure where free living parasitic helminths are present, or may be present.

15. The method of claim 13, wherein the treatment environment is a plant or part thereof, animal waste or part thereof, ground or soil or part thereof, or materials that make up the ground or soil or part thereof.

16. A method of controlling free living parasitic helminths at a treatment locus comprising contacting a treatment locus, or at least one free living parasitic helminth at a treatment locus, with a formulation of claim 1.

17. The method of claim 16, wherein contacting is for a sufficient time to allow the formulation to control the free living parasitic helminths at the treatment locus.

18. The formulation of claim 1, wherein the formulation has a pH greater than 7 but less than 8.5.

19. The formulation of claim 1, wherein the formulation has a pH greater than 7 but less than 8.

20. The formulation of claim 1, wherein the formulation has a pH greater than 7.5 but less than 8.0.

21. The formulation of claim 4, wherein the parasitic helminths are nematodes.

22. The method of claim 15, wherein the treatment environment is a forage plant, pasture plant, grass plant, or parts thereof.

23. The method of claim 15, wherein the treatment environment is animal faeces and/or faeces comprised in effluent.

* * * * *